United States Patent Office 3,137,588
Patented June 16, 1964

3,137,588
MODIFIED STARCH PRODUCT FOR COATING CELLULOSIC WEBS
Kelley G. Taylor, Decatur, Ill., assignor to A. E. Staley Manufacturing Company, Decatur, Ill., a corporation of Delaware
No Drawing. Original application Oct. 6, 1959, Ser. No. 844,641, now Patent No. 3,081,199, dated Mar. 12, 1963. Divided and this application Aug. 30, 1960, Ser. No. 52,765
12 Claims. (Cl. 117—62.2)

This invention relates to the coating of cellulosic webs and especially to process, composition and product through which improved wet-rub resistance may be imparted to a paper pigment coating (or "color") using starch as the adhesive.

In the manufacture of paper, mineral coatings are usually applied to a base paper stock to impart opacity and especially to provide a smooth and receptive surface for printing. Such coatings include a mineral pigment and an adhesive which are applied together in an aqueous dispersion. The adhesive serves to bind the pigment particles to each other and to the surface of the paper. For some applications, it is desirable and even necessary to develop in the coating a substantial resistance to wet-rubbing, i.e., resistance to abrasion when the coating is wet with water. Wet-rub resistance is especially important in paper or paperboard for offset printing and in board for refrigerator food containers.

Starch has been used as the adhesive in the application of mineral coatings on paper. Starch has good color and produces bright coatings of good printing quality. Further, starch has less odor than protein-based adhesives (such as casein) which are also used; starch also has less tendency to foam and to spoil than casein.

Unfortunately, starch has a major shortcoming as an adhesive in paper coating; when starch is used alone, the coatings are not water resistant. Many attempts have been made to improve the water resistance of starch-based coatings rather than to substitute other materials, principally because starch is easy to apply and is inexpensive in addition to the advantages noted. None of the attempts has been fully successful. Many are described on pages 1024 and 1025 of Pulp and Paper by James P. Casey, Interscience Publishers, New York, 1952. As pointed out in this book, such coatings must be heated to excessively high temperatures, generally above the boiling point of water, to cure them. The high temperatures necessary limit the types of paper stock that can be used.

A general object of this invention is to provide a new derivative of starch.

Another object is to provide a method of coating cellulosic webs with starch whereby the coating has greatly improved wet-rub resistance.

A more specific object of the invention is to provide a new paper coating adhesive.

Another specific object is to provide a new, inexpensive process of coating papers that imparts sufficient wet-rub resistance for offset printing.

A further object is to provide a coated paper of improved wet-rub resistance.

Other objects will appear in the following description.

In one aspect, this invention is a coating composition comprising a starch component which assays at least 0.5% by weight of carboxyl group and a water-soluble salt of a metal selected from the group consisting of zirconium and titanium.

In another aspect the invention is a method of coating a cellulosic web (such as paper) with a pigment and includes the step of applying to the web a coating composition including an adhesive and a pigment. In this method the adhesive comprises a starch component having at least 0.5% carboxyl group by weight. The starch adhesive is brought into contact with a water-soluble salt of a metal of the group consisting of zirconium and titanium to render the coating water-resistant.

Still another aspect of the invention is a cellulosic web coated with a starch component of the composition referred to which is rendered resistant to wet-rubbing by contact with a water-soluble salt of a metal of the group consisting of zirconium and titanium.

The starch component containing reactive carboxyl groups may be prepared by a number of different methods. A principal method is the hypochlorite oxidization of starch in which a suspension of granular starch is warmed in the presence of an alkaline bleach and then neutralized. For example, to an aqueous granular starch suspension at about 120 to 125° F. a bleach at a pH of 9.0 containing about 3.3 parts of chlorine to about 5 parts of caustic soda is added. At the conclusion of the reaction the suspension is neutralized to a pH of around 6. The hypochlorite treatment oxidizes a proportion of the hydroxyl groups in the starch molecule to carboxyl. The hypochlorite oxidation will also introduce carboxyl groups into gelatinized starch.

Another method of preparing a modified starch containing carboxyl groups is disclosed in my copending application, Serial No. 817,036, filed June 1, 1959, now U.S. Patent No. 3,071,573. The method disclosed there comprises reacting granular starch in the presence of water and an alkaline catalyst with an etherifying agent selected from the group consisting of the methyl and ethyl esters of crotonic and itaconic acids and the esters of acrylic acid. This process introduces a sodium carboxyalkyl ether substituent in the starch and, when the product is neutralized with acid, contains reactive carboxyl groups.

Still other methods of introducing the carboxyl group (as a carboxyalkyl ether) are disclosed in several U.S. patents. In Patents 2,654,736 (Caldwell), a beta-lactone is reacted with granular starch; in the Patent 2,660,577 (Kerr) a beta- or a gamma-lactone is reacted with commercially dried granular starch. In U.S. Patent 2,773,057 (Hjermstad et al.), a monochlorine-substituted, saturated fatty-acid salt, such as sodium chloroacetate, is reacted with granular starch; the chloroacetate reaction yields a carboxymethyl ether. Still another method produces what is referred to as a dicarboxyl starch. In this method (U.S. Patent 2,894,945 to Hofreiter et al.), a periodate-oxidized starch containing dialdehyde groups is treated with a water-soluble inorganic salt of chloric acid to oxidize the dialdehyde groups.

The carboxy starch may be based on any of the native starches, corn, potato, wheat, rice, tapioca, sorghum, etc. Any of the starch modifications resulting from the processes described may be used for the present invention. However, it is preferred to use hypochlorite-oxidized granular starch since this is relatively inexpensive, produces a starch paste of relatively low viscosity and most important, in its spray-dried form, it produces a starch paste in cold water.

The usual procedures employed in preparing paper coating compositions may also be used in accordance with this invention. First, a starch paste is prepared. If the starch pastes in cold water, only mixing is necessary. If it does not paste in cold water, the starch component is cooked in water at about 25–30% solids at an elevated temperature which is frequently above about 150 to 160° F. for 15–20 minutes. In this step the starch is gelatinized, as is well known, the granules swelling in water to form a solution or suspension that is referred to as a paste. A mineral suspension is separately prepared with a high solids content of pigment, for example, this may be a 70% clay slip, the balance being water. The pigment suspension and starch paste are mixed and a dispersant is added to form the coating composition or coating color. Frequently, a soap is added, for example, sodium stearate, to prevent sticking or dusting during the process of supercalendering. Methods of preparing the pigment suspension are described in chapter XVIII of Pulp and Paper referred to before.

In performing the paper coating process of this invention the metal salt may be brought into contact with the carboxyl starch in either of two ways. In the first, the coating color is prepared in the usual way using carboxy starch. The color is applied to the paper web without having the metal salt present. Then, a wash coat, i.e., an aqueous solution of the metal salt, is flowed over the coating to render it insoluble. With a low-solids color, it may be necessary to air-dry the color before applying the wash coat; otherwise drying before application of the wash coat is unnecessary. The metal salt may be such that it reacts immediately with the carboxyl starch to render the starch insoluble or the metal salt may remain latent in the coating until the coating is heated to dry it, as is necessary in paper making. The zirconium salts that are effective in this procedure include zirconyl chloride and bromide, zirconyl acetate, zirconium oxalate, zirconium tetrachloride and zirconium sulfate. The zirconium ammonium carbonate complex salt may also be used in this process, being made active in the drying step. (This last salt is prepared from ammonium carbonate and a water-soluble zirconium salt such as the oxychloride or tetrachloride, and it is also available as a prepared solution.) Titanium tetrachloride, or titanium oxalate may be used in this procedure.

To obtain the most rapid penetration of the wash coat into the deposited coating a small amount of a wetting agent, such as a quaternary amine (e.g., octadecyl trimethyl ammonium chloride) may be added to the metal salt solution.

In the second method of bringing the carboxy starch and selected metal into contact, the metal, as a salt, is incorporated in the coating color before it is applied to the paper web. The metal salt is preferably part of the adhesive fraction of the coating composition, i.e., it is included with the starch component. In this case, the color is prepared and applied to the paper web, as described above, and then dried. In the drying the metal salt is activated and reacts with the carboxy starch to render the film insoluble. Salts useful in this procedure include zirconium ammonium carbonate. It is necessary in this procedure to keep the metal inactive until the coating color has been applied to the paper web because the metal will otherwise react with the starch in the color before it is applied to the paper. The result is an undue increase in the viscosity of the coating color whereas the desired effect is a low viscosity with a high solids content. In this procedure especially, it is preferred to use the spray-dried hypochlorite-oxidized starch which pastes in cold water. This composition, a dry potential adhesive comprising the starch component and the metal salt, will normally be packaged as a comercially dry mixture so that the adhesive may be prepared in the conventional manner by the paper mill. Commercially dry starch products may contain up to about 15% moisture, but even under these conditions the composition of this invention is stable on storage.

The proportion of starch conventionally used in coatings of this type may also be used with this invention. The preferred range is about 15 to 20% starch dry substance based on the weight of clay. However, useful results are obtained with as little as 12% starch, and while more than 20% may be used with improved results, this dilutes the pigment deposited and is more expensive. The solids content of the coating composition, which depends on the method used for applying the coating, may be the conventional proportions and 40 to 55% solids is satisfactory. The coating color may contain other additives which are customary in this process such as, for example, a very small amount of a wetting agent or of an agent that suppresses foaming. Frequently, a polymer latex, such as styrene- butadiene, is added to the color to increase dry coating flexibility, and the adhesive of this invention is compatible with such latexes.

The proportion of the selected metal salt to the starch component varies with a number of factors, such as the desired wet-rub resistance, the carboxyl content of the starch and the method used in bringing the metal salt into contact with the starch. When the metal salt is included in the adhesive, as little as 1% of the metal (expressed as oxide) by weight of the dry starch component will improve the wet-rub resistance if the starch component contains at least 1% carboxyl groups. On the other hand, if the carboxyl assay is as low as 0.5%, it is necessary to use more of the metal salt, at least 2% of the metal( expressed as oxide) by weight of the starch content. If the metal salt is used as a wash coat, a 0.5% solution is adequate to improve the wet-rub resistance when the carboxyl content assay is at least 1%. On the other hand, when the carboxyl content is 0.5%, the wash-coat solution should contain at least 1% of the metal (expressed as oxide). In either case, the wet-rub resistance is further improved by increasing the ratio of metal salt to starch component. In using a wash coat, evidently, the time of contact will have considerable influence on the concentration used since the web-rub resistance depends more on the amount of metal salt that reacts in the coating than on the concentration in the wash-coat solution. The time of contact that can be used conveniently on present paper coating machinery varies with the individual machine, and therefore the concentration of the metal salt solution may have to be adjusted to take this into account.

When paper is to be supercalendered, a soap, such as sodium stearate, is often added to prevent sticking or dusting during the supercalendering operation. The stearate or other long-chain fatty acid used for this purpose not only does not interfere with the process of this invention but, in fact, enhances the water-insolubility of the coating and, furthermore, the presence of the soap makes the coating more pliable and flexible. For this reason, it is preferred to include a soap in the coating composition of this invention even though the paper will not be supercalendered. Any of the long chain fatty acids that form soaps may be used for this purpose, such as stearic, palmitic, lauric, oleic, caproic, myristic, etc.

In the carbonyl assay, the starch is first treated with dilute methanolicnitric acid to remove any alkali and to free the acid groups. The starch is then washed free of acid and water with methanol and dried. A weighted sample of the dried starch is then soaked overnight in one normal standardized aqueous sodium hydroxide. The excess sodium hydroxide is then back-titrated standardized dilute hydrochloric acid to a phenolphthalein end-point to estimate the amount of sodium hydroxide consumed in neutralizing the carboxyl groups.

In order to characterize the wet-rub resistance of the papers coated in accordance with this invention, the coatings were tested using a modification of routine control method RC–184 of the Technical Association of the Pulp and Paper Industry. This routine control method employs an instrument known as the Taber Abraser. This machine has a horizontal rotating table, to which a sample may be clamped, and a counting mechanism to record the number of rotations of the table. Above the table there is a weighted, pivoted arm on which a rubbing element may be mounted so that it bears against the sample on the sample table during rotation. The pressure exerted by the rubbing element is adjustable by means of counterweights hung from the arm. The routine control method described in the Technical Association issuance employs a brush as the rubbing element. In the tests performed for this invention, a felt-rimmed wheel was used, with the wheel rotating against the surface of the coated paper sample. To determine the wet-rub resistance of a sample, the wheel is saturated with water before the test. After a given number of cycles, the pigment picked up by the wheel is carefully washed into a predetermined volume of distilled water, and the pigment suspended in the volume of distilled water is determined by means of a turbidimeter using distilled water as a standard. Before use, the apparatus is carefully calibrated so that the turbidity measurement represents the amount of pigment removed in the particular number of cycles used in the test. The result is expressed in milligrams of pickup by the wheel.

The following examples are presented to illustrate this invention with the understanding that the invention is not limited to the details disclosed. In these examples all percentages are by weight.

*Example 1*

An adhesive was prepared with 42 grams of hypochlorite-oxidized starch reacted with ethyl acrylate, as described before, so that the total carboxyl assay was 2.1%. The starch component was pasted in aqueous zirconyl ammonium carbonate prepared by dissolving 10 grams of zirconyl chloride ($ZrOCl_2 \cdot 8H_2O$) in 140 milliliters of water and adding ammonium carbonate to a pH of 9. This adhesive was mixed with 300 grams of clay slip containing 70% solids to form the coating composition. The color prepared in this manner was applied upon a 0.012 inch sulfite-bleached paperboard by pulling a puddle of the color over the paperboard with a #14 wire wrapped rod. One sheet prepared in this manner was dried on the drying roll of a Noble and Wood paper machine which heats the coating for three minutes at 190° F.

The test on the Taber Abraser yielded a pickup of 12 milligrams after 10 cycles and 23.5 milligrams after 20 cycles.

*Example 2*

The procedure of Example 1 was repeated with a spray-dried, highly hypochlorite-oxidized starch, which swells and is soluble in cold water. The carboxyl assay was 1.1%. This cold-water solubility is of advantage since it suppresses any reaction that might take place between the starch and zirconium ion during the cooking of the starch. The pigment pickup on this sample was 8 milligrams after 10 cycles on the Taber Abraser and 27 milligrams after 20 cycles.

*Example 3*

A hypochlorite-oxidized starch was reacted with ethyl acrylate as described in my copending application referred to above and 56 grams of this product (assaying 2.1% carboxyl) was converted to the ammonium salt by acidifying, filtering, resuspending and adjusting the pH to about 9 with ammonium hydroxide. The ammonium carboxyethyl starch was cooked in 86 grams of water to form a paste. To this 10 grams of stearic acid was added. A solution of zirconium ammonium carbonate was prepared by dissolving 7 grams of zirconyl chloride octahydrate in 20 grams of water and added 11 grams of ammonium carbonate. The zirconium solution was mixed thoroughly with the starch paste to form the adhesive. Then the adhesive was mixed with 300 grams of a 70% clay slip and stirred for approximately an hour. The final composition was applied on the paperboard of Example 1 with a #14 wire wrapped rod. The board was then roll dried. The wet-rub resistance was measured on the Taber Abraser and the results were a pickup of 5.5 milligrams of pigment in 10 cycles and 20 milligrams in 30 cycles.

*Example 4*

A commercial aqueous solution of zirconium ammonium carbonate was used as received from the National Lead Company. This contains approximately 10% zirconium dioxide by weight. Forty-two grams of the carboxyethyl starch of Example 3 were converted to the ammonium salt and pasted in a solution of 100 grams of the zirconium ammonium carbonate solution, 10 grams of stearic acid and 60 grams additional of water. The paste was thoroughly mixed with 300 grams of a 70% clay slip. This composition was applied as a coating and the coating was dried as described in Example 3. The wet-rub resistance was determined on the Taber Abraser and the pigment pickup was 3 milligrams after 10 cycles, 4.5 milligrams after 30 cycles and only 13 milligrams after 100 cycles.

*Example 5*

With the same ingredients and proportions as in Example 1, but omitting the zirconyl ammonium carbonate, a clay-pigmented color was prepared and applied as described in Example 1. Within a few seconds after application, a wash coat of an 8% aqueous solution of zirconyl chloride was pulled down over the paperboard with a #14 wire-wrapped rod. The coating was air dried only. The test indicated that the pigment pickup was only 1.5 milligrams after 10 cycles and 6 milligrams after 100 cycles.

*Example 6*

The procedure of Example 5 was repeated except that the zirconyl chloride concentration in the wash coat was increased to 10%. The air dried coating was tested on the Taber Abraser and the pigment removed was 1.5 milligrams in 10 cycles and 2.5 milligrams in 100 cycles.

*Example 7*

The procedure of Example 5 was repeated except that a 10% solution of zirconium tetrachloride was substituted for the zirconyl chloride. The air dried coating was tested on the Taber Abraser and the pigment removed was 1.5 milligrams after 10 cycles and 2.5 milligrams after 100 cycles.

*Example 8*

The procedure of Example 6 was repeated except that the starch used was a conventional hypochlorite-oxidized starch that was not further modified. The carboxyl assay was 1.1%. After roll drying the coating was tested and the pigment removed was only 8.5 milligrams after 100 cycles.

*Example 9*

The two-coat procedure was repeated using a 5% dicarboxyl starch. (The 5% refers to the number of dicarboxyl units per 100 anhydroglucose units.) A 4% zirconium tetrachloride solution was applied as a wash coat. After drying the coating was tested on the Taber Abraser and the pigment removed was 1 milligram after 100 cycles and 2 milligrams after 200 cycles. The excellent results with this starch component is attributable to the high carboxyl content.

*Example 10*

The procedure of Example 9 was repeated except that a 4% zirconyl chloride solution was substituted. After drying the coating was tested and the pigment removed was 1.5 milligrams after 10 cycles and 2.5 milligrams after 100 cycles.

*Example 11*

The procedure of Example 5 was repeated except that the starch concentration was changed to 16% of the clay and a zirconium acetate solution assaying 4% $ZrO_2$ was substituted for the zirconyl chloride solution. The test indicated that only 4.5 milligrams of pigment was removed in 100 cycles.

*Example 12*

Using the carboxyethyl starch of Example 1 but with a carboxyl assay of 0.57% (blank equals 0.22%) a series of coatings were prepared at varying zinconyl chloride contents. The results show that a measurable improvement in wet-rub resistance was obtained at this small carboxyl content and that the wet-rub resistance was further improved as the concentration of the zirconyl chloride wash solution was increased. The results obtained with an 8 and a 10% zirconyl chloride were slightly worse than the results obtained in Example 1 whereas the results obtained with a 4% solution were about 20% better than the blank (no zirconium solution wash).

While the examples given have for simplicity been limited to a paper-coating clay as the pigment, I have used others of the conventional pigments, such as titanium dioxide, calcium carbonate, etc., with equally good results.

This invention is also useful as a finish for cotton fabrics. It imparts to the fabrics the same hand and pleasing appearance desired in the finished goods that starch does. However, it lasts much longer on repeated washings than starch which ordinarily is removed in the first few washings. Of course, in this use of the invention, the mineral pigment and other additives necessary for paper coating are not used.

This application is a division of my copending application Serial Number 844,641, filed October 6, 1959, now U.S. Patent No. 3,081,199.

Since many embodiments may be made of this invention and since many changes may be made in the embodiments described, the scope of this invention is not to be limited to the details disclosed but it is set forth in the claims following hereafter.

I claim:

1. In the process of coating a cellulosic web with a pigmented coating, which includes the steps of preparing an aqueous coating composition containing pasted starch, applying said composition on said web and drying the coating web at an elevated temperature, the improvement for rendering said coating resistant to wet rubbing, which comprises providing a dry potential coating adhesive consisting essentially of a carboxy starch having at least 0.5% carboxyl groups and a water-soluble metal salt that reacts with said carboxy starch in the presence of water under paper-drying conditions to render the modified starch substantially non-dispersible in water, the metal of said salt being selected from the group consisting of titanium and zirconium, the proportion of said metal, expressed as oxide, being at least 1% by weight of the dry starch when the starch contains at least 1% carboxyl-groups and at least 2% by weight of the dry starch when it contains 0.5 to 1% carboxyl groups.

2. The method of claim 1 in which the carboxy starch is a hypochlorite-oxidized starch.

3. The method of claim 1 in which the carboxy starch is a cold-water-swelling, hydrochlorite-oxidized starch.

4. The method of claim 1 in which the starch component is a carboxy alkyl ether of starch.

5. In the method of coating paper in which a coating composition is prepared from a starchy adhesive and a pigment dispersion and the composition is applied to a surface of paper, the improvement for rendering the coating resistant to wet rubbing that comprises preparing said coating composition from a starchy adhesive whose starch is carboxy starch having at least 0.5% carboxyl groups, said coating composition including also a water-soluble salt of a metal selected from the group consisting of zirconium and titanium, and, after the coating composition has been applied to a surface of the paper, reacting said adhesive with the metal of said salt to insolubilize the starch, the proportion of said metal, expressed as oxide, being at least 1% by weight of the dry starch when it contains at least 1% carboxyl groups and at least 2% by weight of the dry starch when it contains 0.5 to 1.0% carboxyl groups.

6. In the method of coating paper in which a coating composition is prepared from a starchy adhesive and a pigment dispersion and the coating composition is applied to a surface of the paper, the improvement for rendering the coating resistant to wet rubbing that comprises preparing said coating composition with a starchy adhesive whose starch is a carboxy starch having at least 0.5% by weight of carboxyl groups, and after said coating composition has been applied to the paper, applying an aqueous metal salt to said applied coating composition to insolubilize the starch, the metal of said salt being selected from the group consisting of zirconium and titanium, the proportion of said metal, expressed as oxide, in said aqueous metal salt being at least 0.5% by weight when the starch contains at least 1% carboxyl groups and at least 1% by weight when the starch contains from 0.5 to 1.0% carboxyl groups.

7. The method of claim 6 in which the carboxy starch is a hypochlorite-oxidized starch.

8. The method of claim 6 in which the starch is a carboxy alkyl ether of starch.

9. The method of claim 5 in which a small proportion of a long-chain, soap-forming fatty acid is included in the paper coating composition.

10. The method of claim 6 in which a small proportion of a long-chain, soap-forming fatty acid is included in the paper coating composition.

11. A paper web having a dry, adherent, wet-rub resistant surface coating containing a major proportion of a pigment bound with an adhesive comprising the aqueous-reaction product of a water-soluble salt of a metal selected from the group consisting of zirconium and titanium and a carboxy starch having at least 0.5% carboxyl groups by weight, the proportion of starch in the range of 12 to 20% by weight of said pigment, the starch having been reacted with a proportion of said metal, expressed as oxide, of at least 1% by weight of the dry starch when it contains at least 1% carboxyl groups and at least 2% by weight of the dry starch when it contains 0.5 to 1% carboxyl groups.

12. The article of claim 11 in which the surface coating contains a small proportion of a soap-forming, long-chain fatty acid.

References Cited in the file of this patent

UNITED STATES PATENTS

| | | |
|---|---|---|
| 2,132,527 | Caesar | Oct. 11, 1938 |
| 2,359,858 | Iler | Oct. 10, 1944 |
| 2,489,651 | Langkammer | Nov. 29, 1949 |
| 2,570,499 | Sigaigo | Oct. 9, 1951 |
| 2,622,997 | Lolkema et al. | Dec. 23, 1952 |
| 2,788,293 | Caldwell et al. | Apr. 9, 1957 |

UNITED STATES PATENT OFFICE
CERTIFICATE OF CORRECTION

Patent No. 3,137,588                                        June 16, 1964

Kelley G. Taylor

It is hereby certified that error appears in the above numbered patent requiring correction and that the said Letters Patent should read as corrected below.

Column 4, line 48, for "carbonyl" read -- carboxyl --; column 7, line 52, for "hydrochlorite" read -- hypochlorite ---.

Signed and sealed this 10th day of November 1964.

(SEAL)
Attest:

ERNEST W. SWIDER
Attesting Officer

EDWARD J. BRENNER
Commissioner of Patents